United States Patent [19]

Zerillo

[11] Patent Number: 4,833,486

[45] Date of Patent: May 23, 1989

[54] INK JET IMAGE TRANSFER LITHOGRAPHIC

[75] Inventor: Samuel D. Zerillo, Hillsboro, N.H.

[73] Assignee: Dataproducts Corporation, Woodland Hills, Calif.

[21] Appl. No.: 70,954

[22] Filed: Jul. 8, 1987

[51] Int. Cl.[4] ........................ G01D 15/16; B41M 3/00

[52] U.S. Cl. ........................................ 346/1.1; 346/75; 346/140 R; 101/450.1; 101/453; 101/463.1; 101/466; 101/467; 400/126

[58] Field of Search ...................... 346/1.1, 75, 140 R, 346/450.1, 453; 101/463.1, 466, 467; 400/126

[56] References Cited

U.S. PATENT DOCUMENTS

| | | | |
|---|---|---|---|
| 2,512,743 | 6/1950 | Hansell | 118/300 |
| 2,516,222 | 7/1950 | Lindmark | 51/320 |
| 4,003,312 | 1/1977 | Gunther | 101/466 |
| 4,176,406 | 11/1979 | Matkan | 365/148 |
| 4,395,946 | 8/1983 | Price | 101/152 |
| 4,439,789 | 3/1984 | Cahill | 358/256 |
| 4,718,340 | 1/1988 | Love, III | 101/116 |

FOREIGN PATENT DOCUMENTS 2806802 8/1979 Fed. Rep. of Germany .

*Primary Examiner*—E. A. Goldberg
*Assistant Examiner*—Gerald E. Preston
*Attorney, Agent, or Firm*—Spensley Horn Jubas & Lubitz

[57] ABSTRACT

An ink jet image transfer lithographic apparatus is coupled to a source for supplying graphics and textual material to an ink jet printhead. The ink jet printhead melts a hydrophobic solid ink and sprays the ink onto a lithographic plate in a predetermined pattern. The solid ink solidifies upon contact with the plate. The plate is then mounted in a lithographic press for lithographic printing. As an alternative, the ink jet printhead may be mounted in a lithographic press for imaging a lithographic plate mounted in the lithographic press or for spraying ink directly onto the plate cylinder of the press. A succession of lithographic plates may be provided around the plate cylinder of the lithographic press and each plate discarded after use, leaving a clean plate on the plate cylinder.

41 Claims, 1 Drawing Sheet

INK JET IMAGE TRANSFER LITHOGRAPHIC

BACKGROUND OF THE INVENTION

1. Field of the Invention

This invention relates to lithographic printing, and particularly relates to an apparatus and technique for producing lithographic plates without a developing step using an ink jet printing apparatus.

2. Description of Related Art

In lithographic printing, a lithographic plate having a hydrophilic surface coated with a hydrophobic material forming an image is mounted on a lithographic press. Typically the plate is rotated beneath a water source to spread water across the plate, and then hydrophobic ink is applied to the plate. The hydrophobic ink does not stick on the uncoated surface of the plate because of the water extending over the uncoated surface. The hydrophobic image repels the water but attracts the ink, and thus ink is applied to the image. The inked image is then used to make lithographic copies.

Many techniques for producing lithographic plates have been developed. In one common method, plates having photosensitive coatings are exposed and developed to leave a hydrophobic image on the plate corresponding to the lithographic image to be printed. The unexposed portion of the plate remains hydrophilic. According to another technique, a transparent sheet having a special coating of graphite and a binder is placed over a plate and subjected to laser beam imaging. The laser beam causes the graphite and binder to transfer to the plate surface to create a hydrophobic image on the plate. Yet another technique includes making plates from a prepared original using master imager machines that resemble photocopiers. According to still another method, a liquid ink is sparyed onto a plate through a stencil and then the plate is heated to harden the ink.

Unfortunately, the prior methods have numerous disadvantages. Some methods require special chemicals, materials or coatings on the plate and a developing or heating step to affix the image to the plate. Other methods require expensive, single purpose equipment, expensive and often potentially harmful chemicals, or considerable operator time to make the lithographic plate. Still other methods require the operator to make an original or a stencil image first and then use the original or stencil to make the plate. However, the original or stencil must be made through other means, requiring time and additional materials. Methods requiring liquid ink restrict the possible plate materials because of absorption or diffusion of the ink into or over the plate. In many if not most cases, the plates are used once and discarded, thereby destroying the image. As a result, short runs are often economically impractical and many businesses cannot afford the expense associated with lithographic printing.

SUMMARY

According to the present invention, an ink jet image transfer lithographic apparatus and method is provided which eliminates these and other disadvantages of the prior methods. The present invention utilizes a solid hydrophobic ink applied to an inexpensive lithographic plate in a predetermined pattern after which the plate may immediately be mounted on a lithographic printing press to produce lithographic copies. Almost any appropriate material may be used for the plate, with little or no problem with the ink running or being absorbed into the plate. Other than the solid ink, no specially coated plates, coatings, materials, or chemicals are needed. No original or stencil is required other than the image pattern information. No intermediate steps or developing or heating processes are required, thereby providing cost savings on equipment and operator time. Also, in one embodiment, no expensive, single-purpose machinery is required because the plate may be made using an ink jet printer that may also be used for routine office work.

In an alternate embodiment of the invention, an ink jet printhead is mounted on a lithographic press next to a lithographic plate cylinder. With the printhead mounted on the press, the operator need only wrap a lithographic plate around the plate cylinder and provide the pattern information to the printhead, whereupon the printhead applies ink in the predetermined pattern directly to the plate. The plate is then ready for immediate use. After use, the plate may be discarded, or cleaned and reused, depending on the type of plate. In another embodiment of the invention, a plurality of plates is attached to the plate cylinder in an onion-skin arrangement so that the top plate may be imaged, used and removed from the plate cylinder, leaving the plate immediately beneath the used plate in position for another image. In yet another embodiment, the printhead prints directly on the plate cylinder and the plate cylinder is cleaned with an appropriate solvent after use.

The pattern may be supplied to the ink jet printhead from, for instance, a personal computer having high resolution graphics capabilities. Once the pattern is loaded into a computer having an output attached to the ink jet printhead, the printhead may be repeatedly used to make plates having that particular pattern and those plates may be immediately used on a printing press. The ink jet printhead can quickly and efficiently reproduce any text and graphics display on the lithographic plate. The graphics and text information can be stored on a magnetic disk or the plate may be stored and reused later, depending on the type of plate. Thus, the present invention provides many important advantages over prior lithographic methods.

BRIEF DESCRIPTION OF THE DRAWINGS

The present invention may be better understood by referring to the following detailed description in conjunction with the attached drawings wherein.

Like reference numbers in the various drawings refer to like elements.

DETAILED DESCRIPTION

Figure 1:
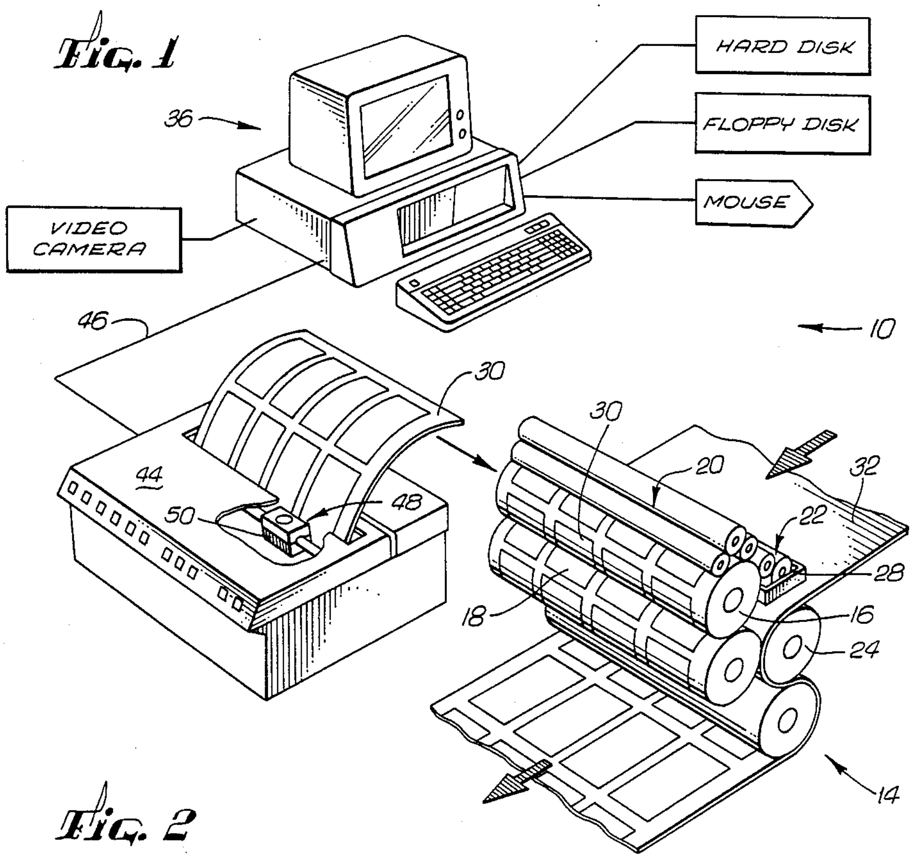
FIG. 1 is a perspective view showing one embodiment of an ink jet image transfer lithographic apparatus according to the present invention.

Referring now to the drawings and particularly to FIG. 1, an ink jet image transfer lithographic apparatus 10 according to the present invention is shown. The apparatus 10 includes a lithographic printing press 14 having a plate cylinder 16, blanket cylinder 18, ink rollers 20, dampening rollers 22, impression cylinder 24, and water font 28 as is known in the art. When the printing press 14 is operated, water from the dampening rollers 22 and ink from the ink rollers 20 are applied to a plate 30 mounted on the plate cylinder 16. Due to the hydrophobic material forming an image on the plate 30, a "positive" image of ink is thereby applied to the plate 30. This "positive" image of ink is transferred to the blanket cylinder 18 and forms a "reverse" image on the blanket cylinder 18. As paper 32 or other printable material passes between the blanket cylinder 18 and the impression cylinder 24, the "reverse" image is printed on the paper, leaving a "positive" image of ink on the paper 32.

Figure 2:
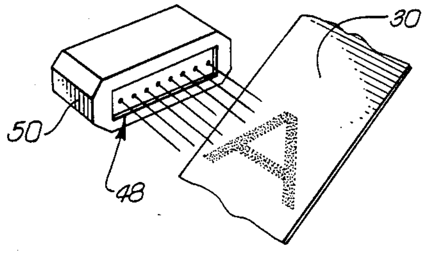
FIG. 2 is a perspective view showing the operation of the solid ink jet mechanism of FIG. 1.

The method of imaging the plate 30 according to the present invention is depicted in FIGS. 1 and 2. The graphics and textual matter to be applied to the plate 30 are provided from an information source such as a computer 36 to a raster-scan ink jet printer 44 via a communication means such as a bus 46. An ink jet printhead 48 contained within the printer 44 prints the provided image on the plate 30 by melting hydrophobic ink in an ink reservoir 50 and spraying minute ink droplets onto the plate 30 in accordance with the image information as the plate 30 passes through the printer 44. The ink solidifies essentially upon contact with the plate 30. Once the ink jet printhead 48 has finished printing the graphics and text onto the plate 30, the plate 30 may be mounted onto the plate cylinder 16 of the lithographic press 14 and used to make lithographic copies.

According to the present invention, the plate 30 may be of any suitable hydrophilic material. Any of the aluminum and paper plates known in the art may be successfully employed. A paper plate having a high clay content has been found to be very useful and economical in the practice of this invention. Coatings such as the expensive photosensitive coatings are not needed because no developing or curing is necessary. Most durable plates such as aluminum plates may be imaged, used, cleaned and reimaged to reduce the equipment expenses of lithographic production.

The ink jet printhead 48 is preferably one equipped to handle solid ink technology and has very high resolution, such as the SI 480 Solid Ink printer sold by Dataproducts Corporation of Woodland Hills, Calif. Examples of the design and operation of the printhead 48, reservoir 50 and printer 44 are more fully described in U.S. Pat. Nos. 4,631,557; 4,593,292; 4,459,601; 4,523,200; 4,539,568; 4,567,570; 4,580,147; 4,607,266; and 4,646,106, and in U.S. patent application Ser. No. 661,794 filed Oct. 17, 1984; Ser. No. 661,924 filed Oct. 17, 1984; and Ser. No. 661,925 filed Oct. 16, 1984, the disclosures of which are incorporated herein by reference. According to alternate aspects of the present invention, a plurality of ink jet printheads form the printhead 48.

The ink used in the present invention is a solid hydrophobic ink that is melted in the ink jet printhead 48 and held in the reservoir 50. On demand, microdots of ink are sprayed onto the lithographic plate 30 in the predetermined pattern. According to one embodiment of the invention, the microdots have a diameter of approximately 0.002 inches. Upon contact with the plate 30, the ink solidifies and leaves an upraised, hydrophobic pattern on the lithographic plate. No developing or drying step is required.

Referring to FIG. 2, the basic operation of the solid ink jet printer head 48 is schematically shown. In the SI 480 solid ink printer, 32 minute holes are arranged on a 4° slant on the front of the printhead 48. At the appropriate times the ink jet are actuated to propel microdots of ink through the holes and toward the paper. The microdots of ink hit the paper and solidify almost immediately to create the proper text and graphics on the plate 30. Of course, other specific arrangements may be employed in carrying out the present invention.

The solid ink technology is more fully described in U.S. Pat. Nos. 4,390,369; 4,484,948; and 4,593,292, and in U.S. patent application Ser. No. 644,542 filed Aug. 27, 1984; Ser. No. 610,627 filed May 16, 1984; and Ser. No. 565,124 filed Dec. 23, 1983, the disclosures of which are incorporated herein by reference. The ink may be formed in a variety of shapes and may be carried as cartridges as disclosed in U.S. Pat. Nos. 4,609,924; 4,636,803; 4,631,557; and 4,641,154, and in U.S. patent application Ser. No. 660,657 filed Oct. 15, 1984; Ser. No. 660,655 filed Oct. 15, 1984; and Ser. No. 661,701 filed Oct. 17, 1984, the disclosures of which are incorporated herein by reference.

The ink may be a composition containing a natural wax or a mixture of natural waxes or a mixture of a natural and a synthetic wax. The natural wax is typically mixed with a coloring agent or a dye such as typophor black, calco chinoline yellow or calco oil yellow for visibility. The wax may act as the fluidic carrier of the ink or may be used as an additive to fatty acids or solvents that act as fluidic vehicles such as oleic acid and benzyl ether. The wax is preferably contained in the final composition in a weight range of 0.5 to 97.0 percent. Preferred waxes include Japan wax, candelilla wax, carnauba wax and mixtures thereof. One preferred ink composition begins to melt at about 76° Celcius and has a viscosity of about 22 centipoise at 80° Celcius, 11 centipoise at 100° Celcius, and, under preferred operating conditions, 9 centipoise when discharged from the printhead 48 at a temperature of 110° Celsius. An example of presently available ink is the SI 480 Solid Ink printer ink sold in cartridges by Dataproducts Corporation for the SI 480 Solid Ink printer. Of course, the "ink" need not be a true ink at all, but may be a meltable, jettable hydrophobic substance having appropriate physical characteristics. Thus, dyes and coloring agents are not required, but only aid in enabling the operator to see the image on the plate.

Figure 3:
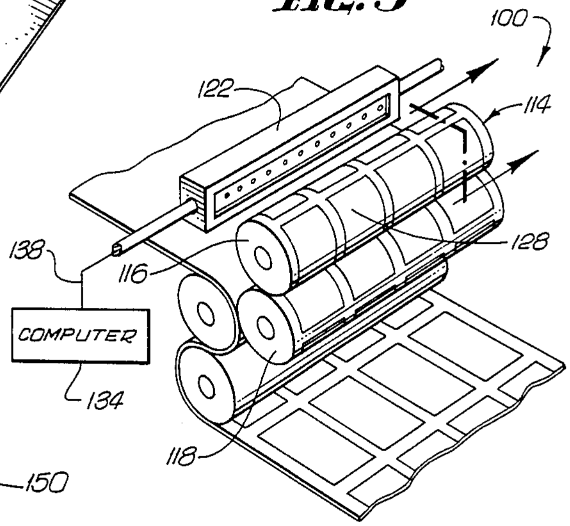
FIG. 3 is a perspective view of a second embodiment of the ink jet image transfer lithographic apparatus according to the present invention.

Referring now to FIG. 3, an ink jet image transfer lithographic apparatus 100 according to a second embodiment of the invention is schematically shown. The apparatus 100 comprises a lithographic printing press 114 having a plate cylinder 116 and a blanket cylinder 118. Adjacent the plate cylinder 116 is an ink jet printhead 122 directed to spray hydrophobic ink onto a plate 128 held on the plate cylinder 116. A computer or other information source 134 supplies graphics and textual information to the printhead 122 via a lead 138.

To operate the second embodiment of the invention, the graphics and textual information to be printed are input into the information source 134. That information is supplied via the lead 138 to the ink jet printhead 122, which prints the graphics and textual material onto the plate 128 using the solid ink. The plate 128 is thereafter immediately ready for use. According to another aspect of the present invention, the plate cylinder 116 is imaged, the copies printed, and then the cylinder 116 is cleaned and may be reimaged. When the lithographic run is completed, the plate 128 or the plate cylinder 116 is discarded or cleaned by an appropriate solvent, such as N-methyl-2-pyrrolidine, and the apparatus 100 is ready for another lithographic run. If a heat-stable material such as aluminum is used for the plate or plate cylinder, the plate or cylinder may be cleaned by heating the plate or cylinder to a temperature above the melting point of the ink and wiping the ink off.

Figure 4:
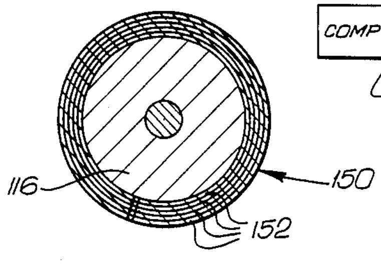
FIG. 4 is a cross-sectional view of an alternate embodiment of the apparatus of FIG. 2.

As shown in FIG. 4, in an alternate embodiment of the invention shown in FIG. 3, a thin roll 150 comprising numerous sheets of plate material is affixed to the plate cylinder 116. The roll 150 provides a plurality of disposable plates on the plate cylinder 116. After one plate has been imaged and used, it is removed and another clean plate is ready to be used on the plate cylinder 116.

Due to the dot nature of ink jet printing, the original pattern on the plate 30 may have minute imperfections along the image edges. However, the solid ink for the precise, correct image is thicker than the ink forming the imperfections and thus is raised above the surface of the plate 30 and above the level of the solid ink imperfections. When the lithographic ink applied to the image on the plate 30 is transferred to the blanket cylinder 18 of the llithographic press 14, only the upraised, correct image is transferred; the lower imperfections are not transferred. Therefore, the copies produced are often better than the original image on the plate 30. Also, if small cracks or voids appear in the solid ink image on the plate, the lithographic ink fills those voids, so that the resulting copies do not contain the imperfections.

The pattern for the lithographic image need not be stored on the plate 30 but may be stored using electronic storage devices such as magnetic disks. If the computer 36 or information source 134 holds the pattern information, the plate cylinder and reusable plates may be cleaned and used for another project and then reimaged and reused for the earlier project. This provides a lithographic printing technique that is economically feasible for even shorter printing runs because there are no expensive chemicals or lithographic plates required and because minimal operator time is required.

Magnetic disk storage capabilities allow the operator to make multiple short runs using inexpensive paper plates over an indefinite time period, yet each run produces identical copies. With some plates, alterations may be made on the plate at any time to permit combination runs having different elements on each different run but having the same general graphics and text display. Thus, the lithographic copies may be "personalized" by adding local or regional information for different printing runs but with the same general graphics display. If the ink jet printhead 122 is mounted on the printing press as shown in FIG. 3, additions to the image on the plate may be made without ever taking the plate 128 off the plate cylinder 116.

From the foregoing detailed description it will be apparent to those of skill in the art that the invention is capable of numerous modifications, substitutions and rearrangements of parts without departing from the spirit or scope of the invention.

I claim:

1. An apparatus for producing lithographic plates comprising:

a source of solid hydrophobic true ink;

a printhead connected to the source of hydrophobic ink to dispense the hydrophobic ink onto a lithographic plate by melting the ink and spraying droplets of the melted ink onto the plate in a predetermined pattern, wherein the ink solidifies essentially upon contact with the plate; and means coupled to the printhead for receiving information containing the predetermined pattern, and for controlling the spray of droplets from the printhead in response to such received information.

2. The apparatus of claim 1 further comprising:

information source means for providing the pattern to be printed by the printhead on the plate; and communication means coupling the information source means and the receiving means for providing pattern information from the information source means to the printhead.

3. The apparatus of claim 2 wherein the information source means comprises a computer.

4. The apparatus of claim 1 wherein the printhead comprises an ink jet printhead and wherein the ink is melted inside the printhead.

5. The apparatus of claim 4 wherein the printhead comprises a plurality of ink jets.

6. The apparatus of claim 1 wherein the ink comprises at least one natural wax.

7. The apparatus of claim 6 wherein the natural wax is contained in an approximate weight range from 0.5 to 97.0 percent.

8. The apparatus of claim 6 wherein the ink further comprises oleic acid.

9. The apparatus of claim 1 wherein the information containing the predetermined pattern is capable of being electronically stored.

10. The apparatus of claim 1 wherein the ink comprises a mixture of natural waxes.

11. The apparatus of claim 1 wherein the ink comprises a natural wax in combination with a synthetic wax.

12. The apparatus of claim 1 wherein the ink comprises at least one natural wax selected from the group of waxes consisting of Japan wax, candelilla wax, carnauba wax and mixtures thereof and has a viscosity of about 9 centipoise when discharged from the printhead apparatus at a temperature of about 110° C.

13. The apparatus of claim 1 wherein the ink is a clear, meltable hydrophobic substance.

14. A method of making a lithographic plate comprising the step of dispensing solid hydrophobic true ink from a printhead onto a lithographic plate in a predetermined pattern by melting the ink in the printhead and spraying droplets of the melted ink onto the plate in the predetermined pattern, wherein the ink solidifies essentially upon contact with the plate.

15. The method of claim 14 further comprising the steps of:

inputting the predetermined pattern into an information source means for indicating the pattern to be printed on the plate; and communicating the predetermined pattern to the printhead.

16. The method of claim 15 wherein the information source means comprises a computer.

17. The method of claim 14 wherein the printhead comprises an ink jet printhead and wherein the ink is melted in a reservoir in the printhead prior to use.

18. The method of claim 17 wherein the printhead comprises a plurality of ink jets.

19. The method of claim 14 wherein the ink comprises at least one natural wax.

20. The method of claim 14 wherein the ink comprises a mixture of natural waxes.

21. The method of claim 14 wherein the ink comprises a natural wax in combination with a synthetic wax.

22. The method of claim 14 wherein the ink comprises at least one natural wax selected from the group of waxes consisting of Japan wax, candelilla wax, carnauba wax and mixtures thereof and has a viscosity of about 9 centipoise when discharged from the printhead at a temperature of about 110° C.

23. The method of claim 19 wherein the natural wax is contained in the ink in an approximate weight range from 0.5 to 97.0 percent.

24. The method of claim 19 wherein the ink further comprises oleic acid.

25. The apparatus of claim 14 wherein the ink is a clear, meltable hydrophobic substance.

26. A method of producing lithographic copies comprising:

inputting a predetermined pattern into an information source for indicating the pattern to be printed on the lithographic copies;

communicating the predetermined pattern to a printhead;

dispensing solid hydrophobic true ink from the printhead onto a lithographic plate by melting the ink in the printhead and spraying droplets of the melted ink onto the plate in the predetermined pattern, wherein said ink solidifies essentially upon contact with said plate;

mounting the lithographic plate onto a lithographic printing press; and printing the copies by running the press.

27. The method of claim 26 wherein the information source comprises a computer.

28. The method of claim 26 wherein the printhead comprises an ink jet printhead and wherein the ink is melted in a reservoir in the printhead prior to use.

29. The method of claim 28 wherein the printhead comprises a plurality of ink jets.

30. The method of claim 26 wherein the ink comprises at least one natural wax.

31. An apparatus for producing lithographic copies comprising:

a lithographic printing press having a lithographic plate surface;

a source of solid hydrophobic true ink;

a printhead mounted on the printing press and connected to the source of hydrophobic ink to dispense the hydrophobic ink by melting the ink and spraying droplets of the melted ink onto the plate surface in a predetermined pattern, wherein the ink solidifies essentially upon contact with the plate surface;

an information source for determining the pattern to be printed by the printhead on the plate surface; and communication means coupling the information source and the printhead for providing pattern information from the information source to the printhead.

32. The apparatus of claim 31 wherein the information source comprises a computer.

33. The apparatus of claim 31 wherein the printhead comprises an ink jet printhead and wherein the ink is melted inside the printhead.

34. The apparatus of claim 33 wherein the printhead comprises a plurality of ink jets.

35. The apparatus of claim 31 wherein the plate surface comprises at least one lithographic plate mounted in the printing press.

36. The apparatus of claim 31 wherein the plate surface comprises a series of lithographic plates each removably mounted in the printing means, only one plate of the series being in position to receive the ink at one time.

37. The apparatus of claim 35 wherein the plate comprises a paper plate having a high clay content.

38. The apparatus of claim 35 wherein the plate comprises an aluminum plate.

39. The apparatus of claim 31 wherein the plate surface comprises a plate cylinder having a hydrophilic surface.

40. The apparatus of claim 31 wherein the ink comprises at least one natural wax.

41. The apparatus of claim 31 wherein the plate surface may be cleaned and re-used.

* * * * *